United States Patent [19]

Lucero et al.

[11] 3,833,016
[45] Sept. 3, 1974

[54] APPARATUS FOR PRECISELY CONTROLLED DILUTION OF FLUID SAMPLES

[75] Inventors: Daniel P. Lucero, Triangle; James D. Barden, Manassas; Joseph W. Paljug, Falls Church, all of Va.

[73] Assignee: Meloy Laboratories, Inc., Springfield, Va.

[22] Filed: Jan. 2, 1973

[21] Appl. No.: 320,660

[52] U.S. Cl. ................... 137/340, 137/341, 261/95, 261/104
[51] Int. Cl. ........................................... F02m 17/28
[58] Field of Search ...... 261/104, 95, 340; 137/341, 137/334

[56] References Cited
UNITED STATES PATENTS

| | | | |
|---|---|---|---|
| 2,594,636 | 4/1952 | Gazda | 261/95 X |
| 3,135,592 | 6/1964 | Fairs et al. | 261/95 X |
| 3,520,110 | 7/1970 | Knauer | 137/341 X |
| 3,520,416 | 7/1970 | Keedwell | 261/104 UX |
| 3,521,865 | 7/1970 | Kertzman | 261/95 |
| 3,532,270 | 10/1970 | Schoen, Jr. | 261/104 UX |
| 3,534,732 | 10/1970 | Bickford | 261/104 X |
| 3,634,053 | 1/1972 | Klass et al. | 261/104 |
| 3,706,872 | 12/1972 | Trabilcy | 137/341 X |
| 3,734,474 | 5/1973 | Olati | 261/95 |

*Primary Examiner*—Henry T. Klinksiek
*Attorney, Agent, or Firm*—Shapiro & Shapiro

[57] ABSTRACT

Concentrated fluid samples, such as flue gas samples, are diluted with high accuracy by precisely controlled diffusion through a permeable membrane. The membrane transversely divides a cylindrical housing into two parts, each part having a cup-shaped core therein with an end wall spaced from the membrane to provide transverse-radial flow passages at opposite sides of the membrane and with a side wall spaced from the side wall of the housing to provide longitudinal flow passages of annular cross-section. Fluid is admitted to each longitudinal passage by means of an enlarged circumferential flow distributing passage and is exhausted from each transverse passage by means of a conduit extending through the end wall of the associated core. Electric heating elements are supported upon the side wall of the housing and are controlled by temperature sensors in the transverse passages adjacent to the permeable membrane. The entire housing is surrounded by insulation so that precise control of the temperature within the housing is possible.

42 Claims, 8 Drawing Figures

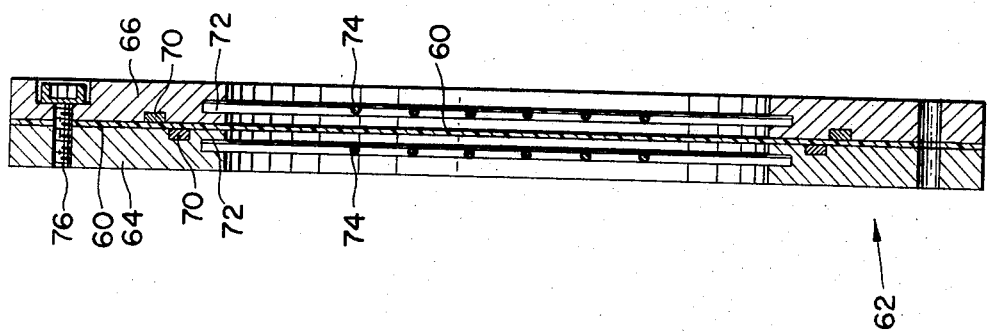
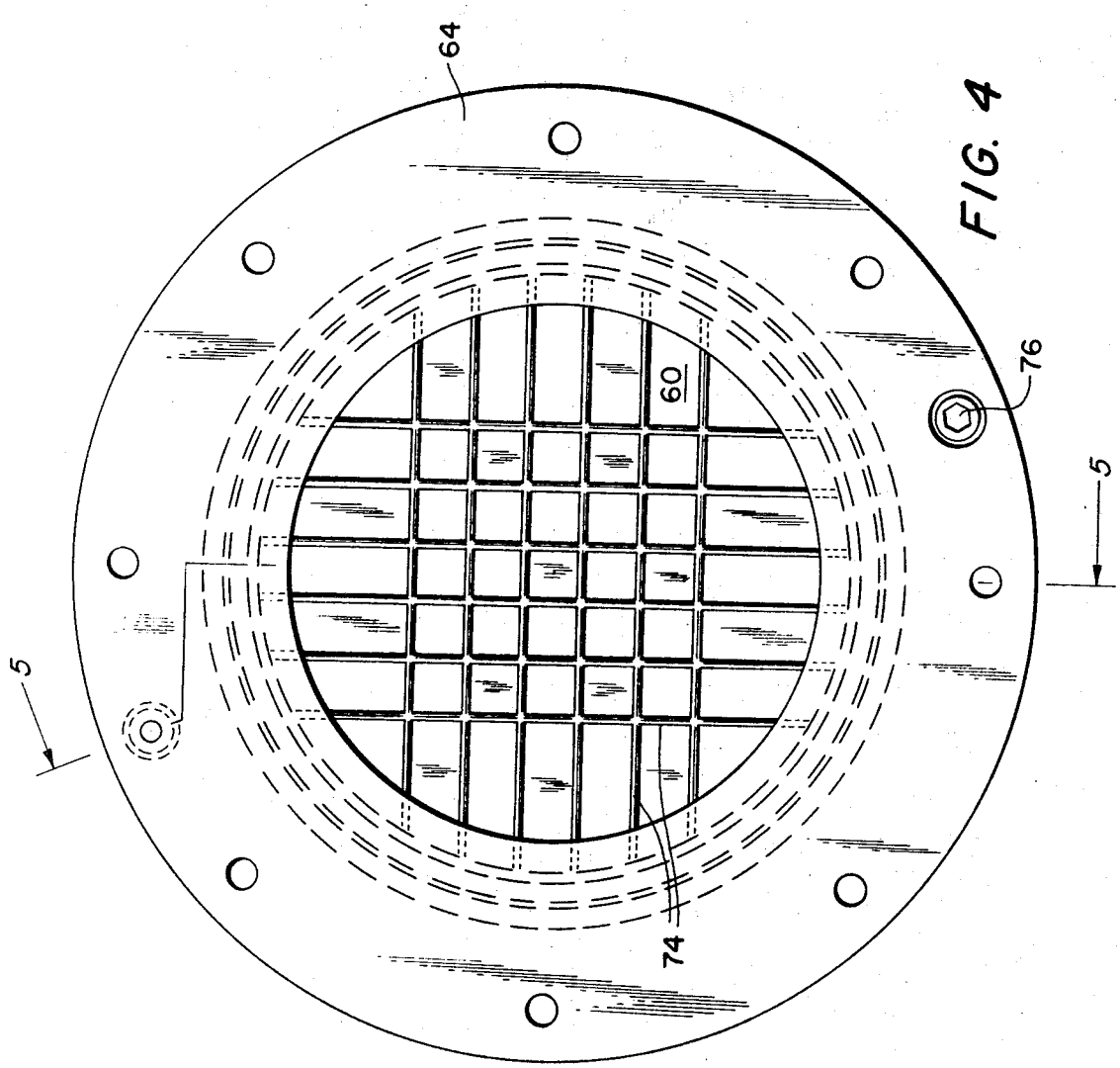

APPARATUS FOR PRECISELY CONTROLLED DILUTION OF FLUID SAMPLES

BACKGROUND OF THE INVENTION

This invention relates to the continuous dilution of fluid samples and is more particularly concerned with precisely controlled dilution of a concentrated gaseous sample by diffusion through a permeable membrane.

In the continuous monitoring of various industrial and scientific processes, it is necessary to dilute a concentrated fluid sample or to mix one fluid with another with great precision. For example, it is common practice to employ a flame photometric detector for measuring the concentration of sulphur dioxide in stack emission samples, but since the concentration of sulphur dioxide molecules in the emission can range from 10–100,000 ppm and since the flame photometric detector can accurately measure sulphur dioxide concentration only at levels below about 1 ppm, it is necessary to provide dilution of the samples over a wide range. In many other instances, also, the sampling rate capacity and/or dynamic range of sample concentration response of the analyzer instrument is limited, and peak instrument performance can only be achieved at low sampling rates (less than 5,000 ml/min) and low concentrations (less than 10 ppm). Reliable and accurate dilution of samples over a wide range is essential to permit measurements at levels which would otherwise be beyond the operating range of many instruments and to provide a better match of source-instrument pneumatic impedance.

Various types of diluting, proportioning or mixing techniques have been proposed in the prior art. See, for example, U.S. Pat. Nos. 3,521,865; 3,533,272; 3,618,911;283,669,637; 3,209,579; 3,699,637; 2,843,138; 3,516,278; British Patent No. 811,401; and *Review of Scientific Instruments*, March, 1955, Vol. 26, No. 3, pp. 305–306. Purely pneumatic dilution systems, in which a stream of sample gas is merely mixed with a stream of carrier gas and conveyed by the carrier gas to the analyzing instrument, provide rather inaccurate dilution and demand a large degree of control of stream parameters and extensive maintenance of equipment. Moreover, it is very difficult to achieve practical stream mixing for dilutions greater than 100:1, while dilutions of from 1000:1 to 100,000:1 may be required for applications such as stack effluent analysis. More reliable and precise dilution has been obtained by diffusion techniques employing permeable or semi-permeable membranes, such techniques being employed, for example, in electrochemical devices, gas chromatography-mass spectrometry systems, and gas purification processes. However, diffusion techniques employed heretofore have suffered from limited dilution range, complexity of apparatus, and inaccuracies due to dependence upon flow rate and temperature. Although it has been known that the amount of permeation or diffusion of a fluid through a permeable membrane is a function of temperature, prior attempts to provide precise temperature control of the permeation process have left much to be desired, despite an extensive body of prior art in the heater, heat exchanger and temperature controller fields, including, for example, U.S. Pat. Nos. 2,706,620; 2,446,367; 1,480,922; 3,368,546; 1,906,450; 1,389,166; 2,730,083; 1,519,395; 1,772,557; and 1,624,843.

SUMMARY OF THE INVENTION

It is accordingly an object of the present invention to provide improved apparatus for diluting concentrated samples and for mixing fluids with high accuracy and precision.

Another object of the invention is to provide apparatus of the foregoing type (referred to generally as dilution apparatus) which operates independently of sample gas flow rate over a wide range of flow rates and which operates at constant temperature despite temperature variations of entering sample and carrier gases.

A further object of the invention is to provide dilution apparatus in which highly accurate temperature control is provided over a large temperature control range and over a large flow rate range.

Another object of the invention is to provide dilution apparatus employing diffusion through a permeable membrane and in which the flow rates of sample and carrier gases at opposite sides of the membrane may be adjusted to maintain the pressure at opposite sides essentially the same without detracting from the performance.

Yet another object of the invention is to provide dilution apparatus in which the sample and carrier gases are utilized to aid in promoting constancy of temperature at the permeable membrane.

A further object of the invention is to provide dilution apparatus in which the degree of dilution can be readily controlled by choice of membrane material, dimensions, and/or geometry.

A still further object of the invention is to provide dilution apparatus in which the degree of dilution can be precisely controlled by controlling membrane temperature.

A still further object of the invention is to provide dilution apparatus in which the degree of dilution can be controlled by control of the dilution gas flow rate.

An additional object of the invention is to provide dilution apparatus which is unusually simple and economical to manufacture and use and which permits ready substitution of permeable membranes.

Briefly stated, a preferred embodiment of the present invention employs a permeable membrane extending transversely within a cylindrical housing. The housing is preferably formed from two aligned housing parts, with the membrane being mounted in a holder interposed between opposed ends of the housing parts. The housing parts are detachably connected so that different membranes may be inserted, depending upon the needs of the associated system. Each housing part has a cup-shaped core inserted therein with the side wall of the core spaced from the side wall of the housing to define a long, thin, large-surface-area longitudinal annular flow passage. The end wall of each core is spaced from a corresponding side of the membrane to provide transverse flow passages communicating with one end of the longitudinal flow passages at the respective sides of the membrane. Enlarged circumferential flow distributing passages are provided at the opposite ends of the longitudinal passages, and inlet conduits are coupled to the flow distributing passages for the admission of sample gas and carrier gas, respectively. Exhaust conduits are coupled to the transverse passages through the end walls of the cores. Electrical heater elements are supported upon the exterior of the housing part side walls and are controlled by temperature sensing elements within the transverse passages to maintain the membrane temperature at a specified level by controlling the gas temperature at opposite sides of the membrane, the entire housing being surrounded by insulation for isolation from ambient conditions.

BRIEF DESCRIPTION OF THE DRAWINGS

The invention will be further described in conjunction with the accompanying drawings, which illustrate preferred and exemplary embodiments, and wherein:

FIG. 4 is a side elevation view of another membrane and membrane support;

FIG. 5 is a transverse sectional view taken along line 5—5 of FIG. 4;

DETAILED DESCRIPTION OF THE INVENTION

Figure 1:
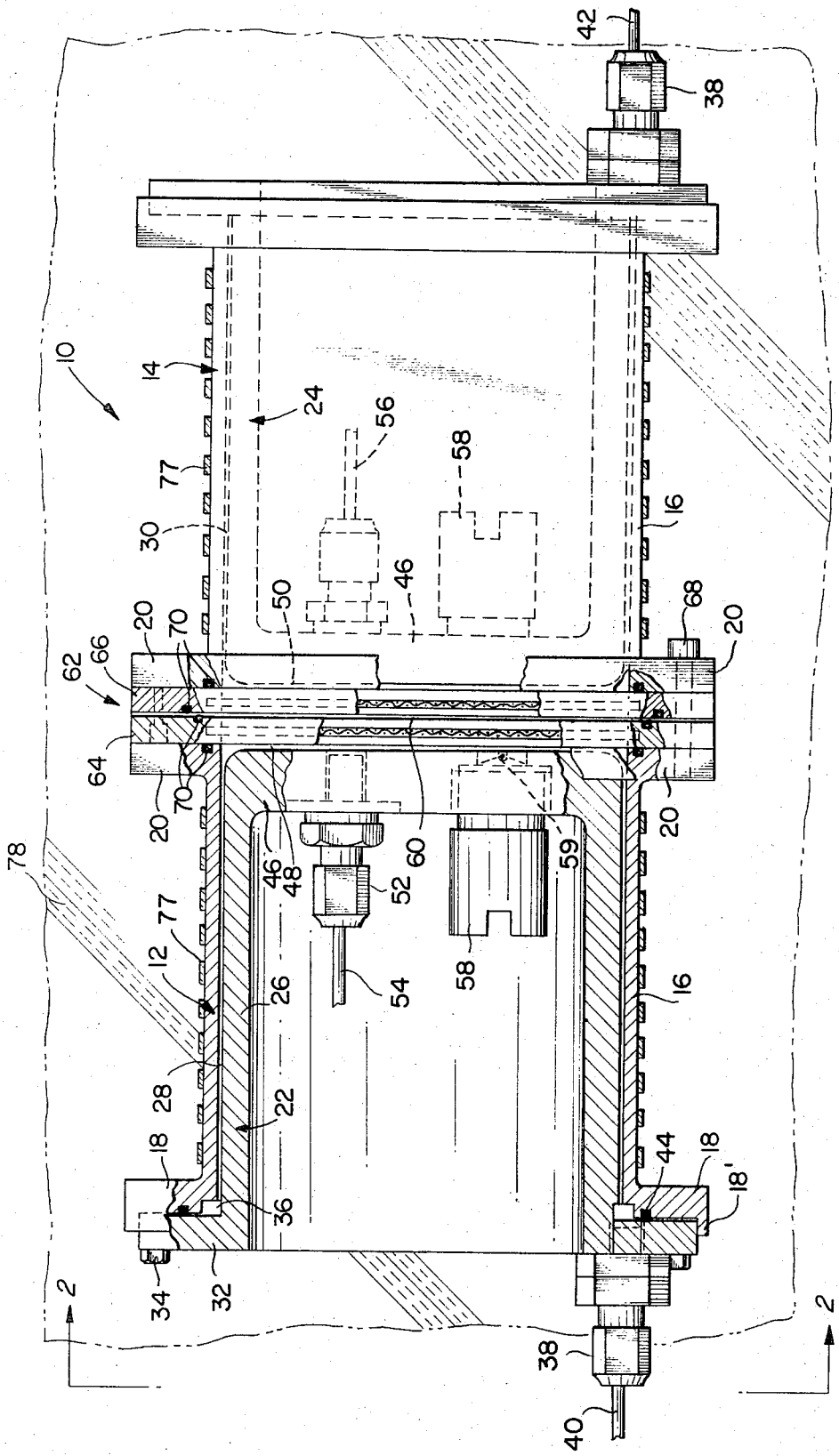
FIG. 1 is a side elevation view, partly in section, illustrating the apparatus of the invention.

Referring to the drawings, and initially to FIG. 1 thereof, the dilution apparatus 10 of the invention comprises a temperature-regulated enclosure having a tubular housing. The housing is preferably a circular cylinder constituted by two cylindrical housing parts 12 and 14, each having a side wall 16. The housing parts are preferably identical (or very similar), so that a description of one suffices for both. Each has circular flanges 18 and 20 extending outwardly from the side wall at opposite ends thereof. The housing parts may be formed of aluminum, but it is preferred that all surfaces in contact with the gas streams be Teflon coated or formed of Teflon.

Figure 2:
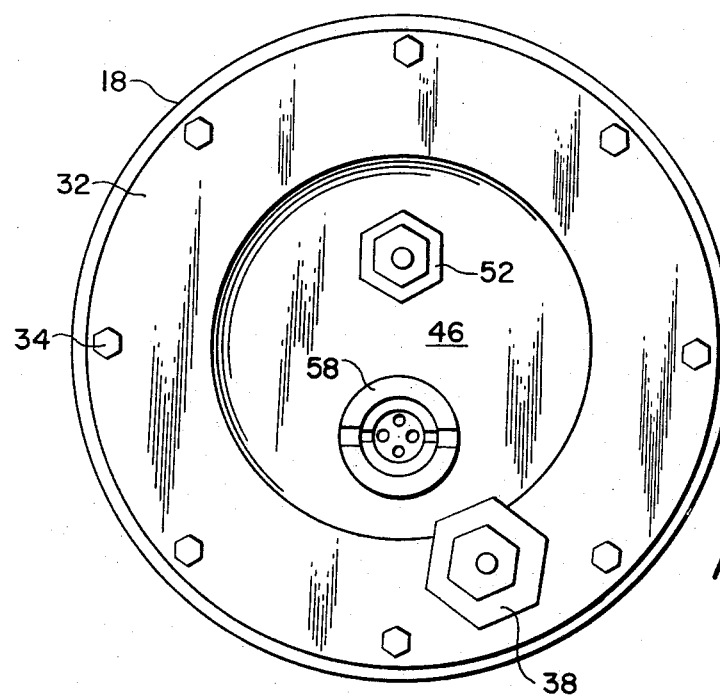
FIG. 2 is an end view of the invention as seen in the direction of the arrows 2—2 of FIG. 1.

Each housing part contains a concentric cylindrical cup-shaped core 22 or 24, with the side walls 26 thereof spaced from the associated side walls 16 of the housing parts to provide long, thin, annular longitudinal passages 28 and 30 of large surface area. The cores, which may be formed of aluminum, for example, are preferably identical and each has an outwardly extending circumferential flange 32 at the open end thereof. Engagement of flanges 32 with flanges 18 limits the insertion of each core into the associated housing part. Lips 18' of flanges 18 surround flanges 32. Screws 34 secure the cores to the housing parts in proper spacial relationship (see FIGS. 1 and 2).

To distribute gas circumferentially as it enters, an enlarged passage 36 is provided at one end of each of the longitudinal passages 28 and 30, and these flow distributing passages are provided with couplings 38 by which the passages are connected to inlet conduits 40 and 42. An O-ring 44 provides a seal between flanges 18 and 32 at each end of the housing.

When the cores have been inserted into the corresponding housing parts so that the flanges 32 engage the flanges 18 as shown, the end walls 46 of the cores will be spaced from a transverse wall of the housing, to be described more fully hereinafter, to provide transverse passages 48 and 50 which communicate with the longitudinal passages 28 and 30, respectively. The end wall 46 of each core is provided with a coupling 52 whereby exhaust conduits 54 and 56 are coupled through the end walls to the passages 48 and 50, respectively. Feed-through plugs 58 are threaded into corresponding receptacles in the end walls 46 to support and seal temperature sensors 59, such as thermistors, in the transverse passages 48 and 50.

Figure 3:
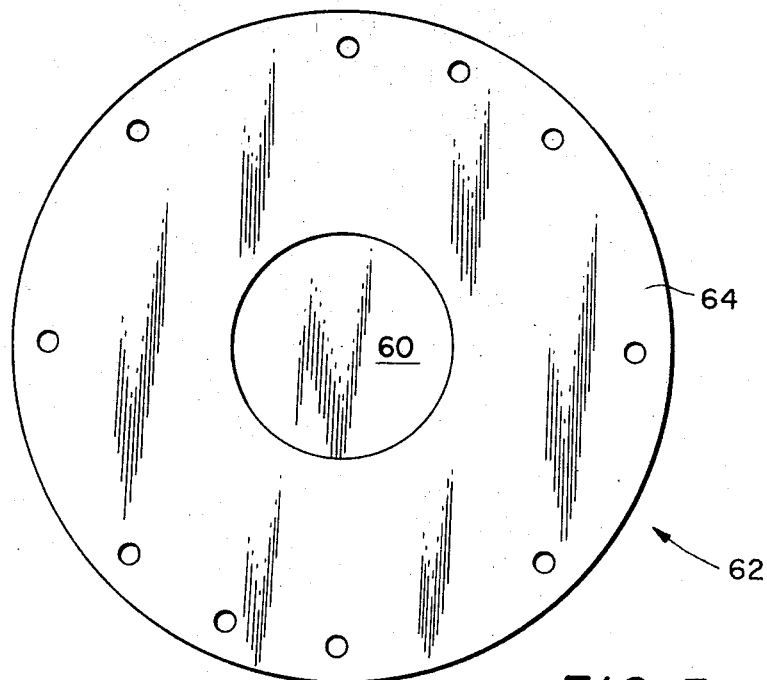
FIG. 3 is a side elevation view of a membrane and membrane support.

The housing of the dilution apparatus 10 is assembled by longitudinally aligning the housing parts 12 and 14 and by connecting them together with a transverse wall interposed therebetween. In the form shown, the transverse wall comprises a permeable membrane 60 supported upon a membrane holder 62. The membrane holder may comprise a pair of annular aluminum plates 64 and 66 (which are Teflon coated) with the membrane sandwiched therebetween, plates 64 and 66 being abutted with the flanges 20 of the respective housing parts 12 and 14 and screws 68 serving to connect the flanges 20 together with the membrane assembly interposed therebetween. O-rings 70 are provided between the abutting surfaces to prevent fluid leakage. FIG. 3 illustrates a simple membrane and membrane holder, while FIGS. 4 and 5 illustrate a more complex membrane holder in which the annular plates 64 and 66 are provided with inwardly facing circumferential grooves 72 which receive screens or grids 74 at opposite sides of the membrane 60. Since the membrane is preferably a very thin sheet (as of Teflon, for example) and hence at high temperature and other conditions may not be entirely self-supporting, the grids 74 may be employed to assist in supporting a membrane of large area or diameter. The screens may be No. 4 mesh and woven of 0.035 inch diameter stainless steel wire which is Teflon coated. Screws 76 are shown for coupling the annular plates 64 and 66 to form an assembly prior to insertion of the membrane and membrane holder into the housing.

Figure 7:
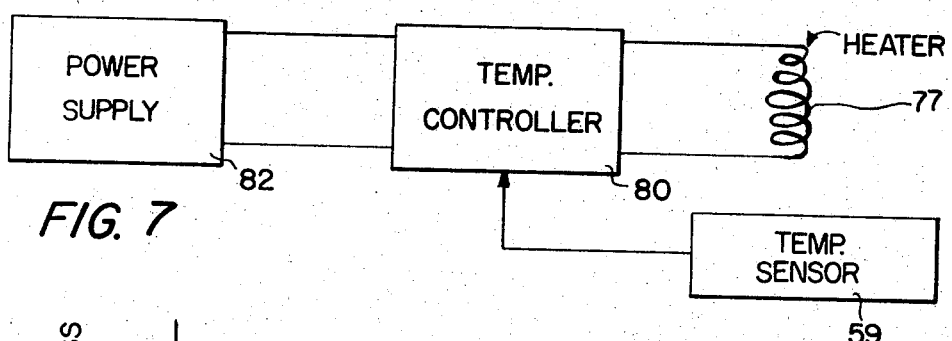
FIG. 7 is a block diagram of a temperature control system employed in the invention.

A heater element 77 is supported on the exterior of the side wall 16 of each of the housing parts 12 and 14. The heater element may be electric heater coils comprised of insulated heater tape wound helically upon the housing. Thermal insulation 78 surrounds the entire enclosure, so as to isolate the enclosure from ambient conditions. FIG. 7 illustrates one of the heater coils 77 in association with a corresponding temperature sensor 59, a temperature controller circuit 80, and a power supply 82. The temperature controller may be a conventional solid state or other type of device which precisely regulates the electric power supplied to the heater in response to the temperature sensor and which may be adjusted to provide different equilibrium temperatures. Such temperature controllers are well known in the art.

Figure 6:
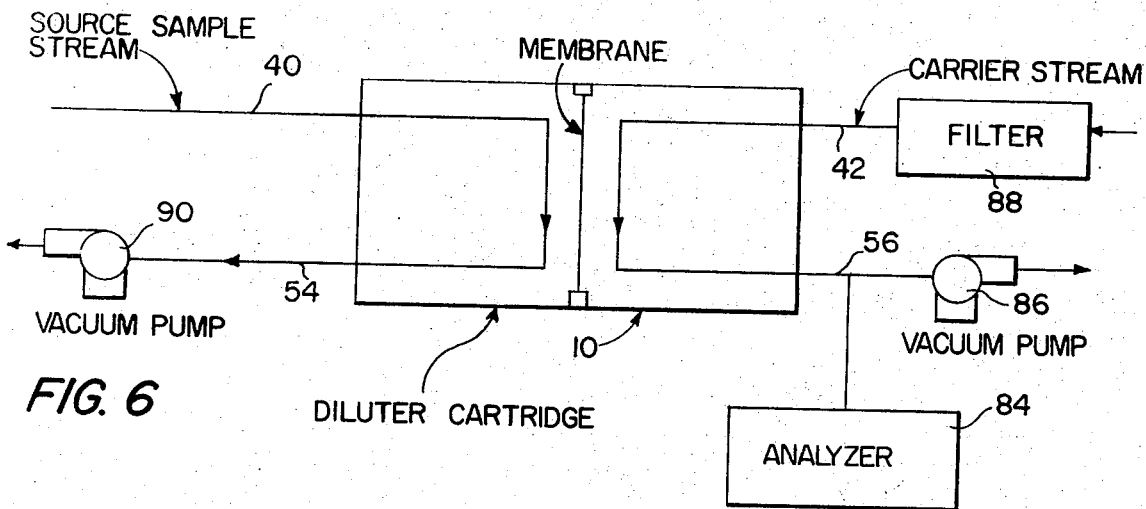
FIG. 6 is an explanatory flow diagram of a system employing the apparatus of the invention.

FIG. 6 illustrates diagrammatically the manner in which the dilution apparatus 10 of the invention may be employed to supply a precisely controlled diluted sample to an analyzing instrument 84. A vacuum pump 86 is connected to the exhaust conduit 56, the inlet conduit 42 being connected to a supply of air (the carrier gas) through a filter 88. Similarly, a vacuum pump 90 is connected to the exhaust conduit 54, the inlet conduit 40 being connected to a suitable sample source, such as a flue gas stream. Referring now to FIG. 1 in conjunction with FIG. 6, it will be seen that the carrier gas and the flue gas sample are admitted to the corresponding flow distributing passages 36, by which these gases are distributed about the circumference of the inlets of the longitudinal passages 28 and 30. The gases then flow along the length of the passages 28 and 30 in intimate contact with the side walls 16 of the associated housing parts, upon which the heaters 77 are mounted. The long, thin, large-surface-area annular flow paths thus provided for each of the gases insure that the gases are heated to an elevated temperature level and that precise control of the temperature of the gases is maintained in the transverse passages 48 and 50 adjacent to the permeable membrane 60. By virtue of the construction of the invention, it is possible to insure precise heating temperature regulation of these gases over a large range of carrier gas and sample gas input temperatures and flow rates. For example, equilibrium temperature is readily attained at the end of passages 28 and 30 adjacent to the membrane for a range of from 200 to 1,600 ml/min. and for inlet gas temperatures from 0°C. to 100°C. At all conditions specified, the gas equilibrium temperatures are within plus or minus 0.1°C. or better.

Dilution of the gaseous samples supplied to the analyzer occurs by virtue of the diffusion process through the permeable membrane 60 as the sample gas flows generally radially in the transverse passage 48 and as the carrier or diluent gas flows generally radially in the transverse passage 50. A portion of the sample gas stream mass diffuses through the membrane, and on the opposing side of the membrane the carrier gas stream mixes with the sample permeating the membrane. Some (or all) of the carrier gas stream containing the sample is bled from conduit 56 to the analyzer 84.

The dilution apparatus of the invention is essentially a combined membrane holder and precisely controlled mass/heat exchanger. The apparatus of the invention can dilute samples with accuracy and precision to as large as $10^6$. By changes of the membrane dimensions and/or temperature, dilution factors can be varied by 300. Larger variations are attainable by changing membrane material to provide materials having different permeability coefficient activation energy and by providing variations in the carrier stream flow rate. However, it has been found that the degree of dilution is relatively independent of the sample gas flow rate over a wide range of flow rates. Hence the pressures at opposite sides of the membrane may be equalized by adjusting the sample and carrier gas flow rates, thereby reducing membrane stresses. The rate of diffusion can be controlled conveniently merely by adjusting the temperature at the membrane and/or by simply substituting one membrane assembly (of different exposed membrane area) for another. Typically, the membrane may be a sheet of Teflon of 0.002 inch thickness. The rate of dilution varies logarithmically with the temperature, and hence constancy of temperature, which is achieved by the invention, is important if constant dilution rate is to be maintained. However, by intentionally changing the equilibrium temperature, the range of sample concentration in the carrier gas for a given flue gas concentration range may be shifted to accommodate a particular analyzer instrument.

The dual-ended construction of the invention provides economy and simplicity, because the housing parts and cores are interchangeable. The provision of the heater on the exterior of the housing only (not on the core or inside of the housing) greatly simplifies the construction. Air baths, preheating coils, and complex gas circulation paths are not required for temperature control. Compactness and efficiency are promoted by the reverse gas flow through each housing part, the gas flowing along the outside of the core in one direction and then reversely through the core in the opposite direction.

The following analytical discussion will assist in an understanding of the principles of the invention and the effect of certain parameters:

The source sample and carrier gas streams are exposed to each other through the membrane. Transfer of each molecular species from one side of the membrane to the other occurs by a diffusion process. The concentration or partial pressure difference of each molecular species across the membrane is the diffusion potential. For example, consider the transport of sulphur dioxide ($SO_2$) across the membrane. Carrier stream $SO_2$ concentration at the exit of the dilution apparatus is related to the membrane $SO_2$ diffusion flow rate by the relationship:

$$[SO_2]_c = [Q_{SO_2}/Q_c]10^6 \qquad 1.$$

$[SO_2]_c$ = Carrier stream $SO_2$ concentration level, ppm.
$Q_{SO_2}$ = Membrane $SO_2$ diffusion flowrate, ml/min.
$Q_c$ = Carrier stream flowrate, ml/min.

For a membrane whose lateral dimensions are much larger than its thickness, $Q_{SO_2}$ is related to the sample stream $SO_2$ concentration by the expression:

$$Q_{SO_2} = 60 P_m A/(\Delta X) [P_{SO_2,s} - P_{SO_2,c}] \qquad 2.$$

$P_m$ = Membrane material $SO_2$ permeability coefficient, cc/sec-cm$^2$-torr/cm.
$A$ = Membrane cross-sectional diffusion area, cm$^2$.
$(\Delta X)$ = Membrane thickness, cm.
$P_{SO_2,s}$ = Sample stream $SO_2$ partial pressure, torr.
$P_{SO_2,c}$ = Carrier stream $SO_2$ partial pressure, torr.

Under most operating conditions $P_{SO_2,s} \gg P_{SO_2,c}$ and $P_{SO_2,c} \to O$. For example, at 100°C. a 5.6 cm diameter and 0.00254 cm thick TFE Teflon membrane will reduce a 1,000 ppm $SO_2$ sample gas concentration to approximately 0.56 ppm in a 200 ml/min carrier stream.

Combining equations (1) and (2) and expressing $P_{SO_2}$ in terms of $SO_2$ concentration relates $[SO_2]_c$ and $[SO_2]_s$ at the diluter carrier stream exit and sample stream entrance as shown below:

$$[SO_2]_c = 60 K_m [SO_2]_s (P_{ts}/Q_c) \qquad 3.$$

$K_m$ = Membrane $SO_2$ conductance, cc/sec-torr.
$P_{ts}$ = Diluter sample side total gas pressure, torr.

The membrane conductance is composed of the ratio $P_m A/(\Delta X)$.

The essential characteristics of the diluter are summarized by equation (3) and a dilution factor defined to directly relate $[SO_2]_s$ and $[SO_2]_c$. It is $$k_d = 60 P_m A P_{ts}/(\Delta X) Q_c$$

where $k_d$ = dilution factor, dimensionless. Within practical limits, any parameter comprising $k_d$ can be varied to obtain a specific dilution or to match analyzer interface requirements. Further, the relative importance of the parameters can be assessed and the theoretical performance limits of the diluter established.

Inspection of equation (3) and $k_d$ shows the effects of A, ($\Delta X$), and $Q_c$. The changes in $k_d$ are directly related to these parameters. Less direct variations are those induced by membrane temperature and material. For example, membrane permeability coefficient varies with temperature in a logarithmic fashion. Therefore, it is possible to obtain significant changes in $k_d$ with membrane temperature. The magnitude of the changes is directly related to permeability coefficient activation energy of the membrane material for the sample gas. Thus, temperature stability measurements can be broadened when employing a membrane material of relatively low permeability activation energy such as fluorosilicone and other silicone rubbers. Materials of high activation energy are polyethylene and polypropylene.

During operation it is essential to control variations of each parameter to the degree prescribed by the requirements of the analyzer. Accuracy and precision tolerances in dilution are directly affected by the degree of temperature control. For example, operation of a Teflon membrane at 200°C with ±1°C temperature control will produce variations or absolute errors in $k_d$ of approximately −1.4 percent and +2.2 percent due to changes in $SO_2$ permeability alone. At lower operating temperatures the error is correspondingly less. Further examination of $k_d$ reveals that the diluter parameters can be classified into thermal, pneumatic, and dimensional categories: membrane temperature, sample gas total pressure and carrier gas flowrate, and membrane thickness and cross-sectional area, respectively.

Figure 8:
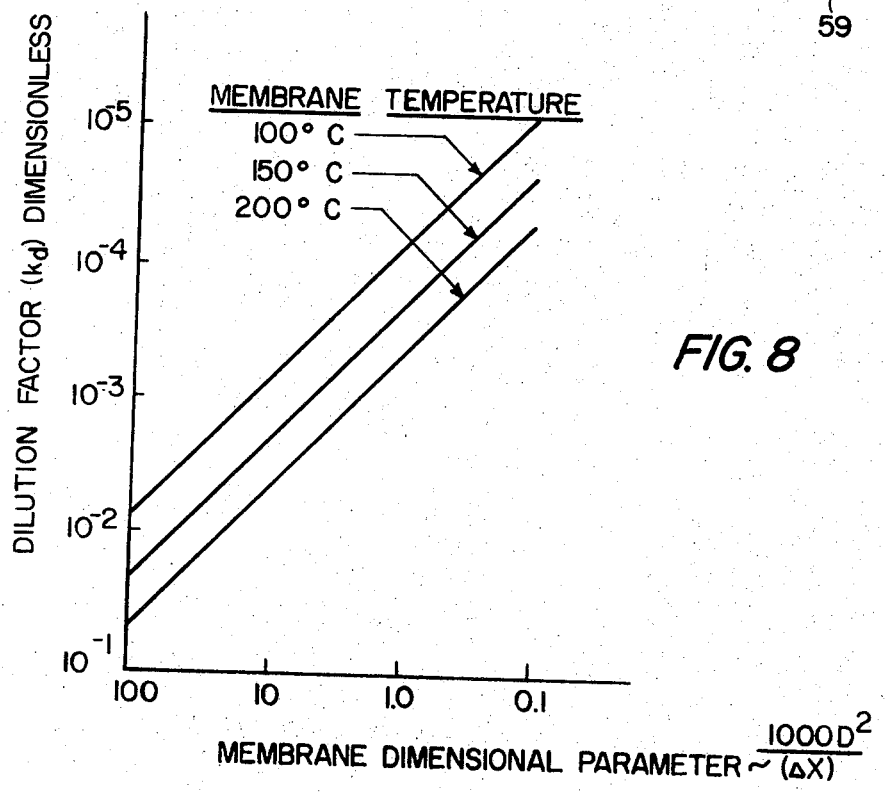
FIG. 8 is an explanatory graphical diagram.

For a specific membrane material, the membrane dimensions and temperature are established by $k_d$ and the carrier gas flowrate ($Q_c$). FIG. 8 is a graphical representation of equation (3). It is an illustration of the typical relationship between the dilution factor ($k_d$), membrane temperature, and membrane dimensional parameter (which for a circular membrane is $1000D^2/(\Delta X)$, where D is the diameter, cm). It is clear that only the required $k_d$ constrains the diluter design. Since it is most convenient to utilize a membrane of a standard fabricated thickness, FIG. 8 may be employed to establish the membrane cross-sectional area. A lower limit to the operating temperature in most applications is determined by other sample properties, such as dew point. Operating temperature, as well as membrane thickness, is usually defined by time rate of response requirements.

In a practical embodiment of the invention, each of the housing parts is 3.74 inches long with an outer diameter of 3.38 inches (neglecting the flanges) and an inner diameter of 3.13 inches. Each core is 3.84 inches long with an outer diameter of 3.08 inches (neglecting the flange) and an inner diameter of 2.56 inches. Flanges 20 and 32 are 0.25 inch thick and flanges 18 are 0.38 inch thick (neglecting lips 18'). Annular plates 64 and 66 are 0.187 inch thick. In an $SO_2$ diluter dilution factors of 101,000, 4975, and 1660 have been attained at 106°C, 140°C, and 203°C, respectively, with 0.0065 cm thick Teflon membranes.

While preferred embodiments of the invention have been shown and described, it will be apparent to those skilled in the art that changes can be made in these embodiments without departing from the principles and spirit of the invention, the scope of which is defined in the appended claims. For example, other types of permeable walls may be employed for the diffusion of fluids (such as hydrogen sulfide, carbon monoxide, or carbon dioxide) diffusable through such walls.

The invention claimed is:

1. Apparatus for providing precisely controlled permeation of a first fluid into a second fluid, which comprises a housing having a substantially planar wall therein premeable to said first fluid which divides the interior of said housing into two parts, means providing a first flow passage for said first flow along one side of said wall, means providing a second flow passage for said second fluid along the opposite side of said wall, means including third and fourth flow passages in said housing for supplying said fluids to said first and second flow passages, respectively, each of said third and fourth passages having a thickness cross-dimension perpendicular to the flow direction therein that is very small relative to the remaining cross-dimensions of the passage so that fluid flows therethrough as a thin sheet, means for exhausting fluid from said first and second passages, heater means secured to walls of said third and fourth passages, and temperature control means for controlling said heater means to control the temperature of fluid flowing in said third and fourth passages whereby the temperature of said permeable wall is controlled.

2. Apparatus in accordance with claim 1, wherein said temperature controlling means comprises means for sensing the temperature adjacent to said permeable wall.

3. Apparatus in accordance with claim 1, wherein said third and fourth passages and said exhausting means are connected to said first and second passages, respectively, such that the fluid flow along each side of said permeable wall between an associated fluid supplying means and fluid exhausting means is between peripheral and central regions of the permeable wall.

4. Apparatus in accordance with claim 1, wherein said permeable wall is a thin membrane.

5. Apparatus in accordance with claim 4, wherein said membrane is supported in a membrane holder having screens spaced at opposite sides of said membrane.

6. Apparatus for providing precisely controlled permeation of a first fluid into a second fluid, which comprises a housing having a wall therein permeable to said first fluid which divides the interior of said housing into two parts, means providing a first flow passage for said first fluid along one side of said wall, means for providing a second flow passage for said second fluid along the opposite side of said wall, and means for controlling the temperature of the interior of said housing, said housing having a core in each part of said housing with a side wall spaced from a side wall of said housing to provide third and fourth flow passages along the side walls of said cores and said housing, said third and fourth flow passages communicating at one end thereof with said first and second flow passages, respectively, and having means at the opposite end thereof for admitting said first fluid and said second fluid thereto, respectively, and means providing exhaust conduits from said housing communicating with said first and second flow passages.

7. Apparatus in accordance with claim 6, wherein said temperature controlling means comprises heater means supported upon the side wall of said housing.

8. Apparatus in accordance with claim 6, wherein said housing and said cores are cylindrical and said third and fourth flow passages are long, thin large-surface-area passages.

9. Apparatus in accordance with claim 8, wherein said cores are cup-shaped.

10. Apparatus in accordance with claim 8, wherein each of said cores has a flange extending outwardly from an end thereof and engaging an associated end of said housing to position the opposite end of the cores in spaced relationship to said permeable wall and thereby to define said first and second flow passages.

11. Apparatus in accordance with claim 10, wherein each of said associated ends of the housing has a lip embracing the associated flange to position the side wall of each core relative to the side wall of the housing.

12. Apparatus in accordance with claim 8, wherein said housing comprises two longitudinally aligned cylindrical parts and wherein said permeable wall has means for supporting the same between opposed ends of said housing parts spaced from end walls of said cores to provide said first and second passages.

13. Apparatus in accordance with claim 8, wherein said admitting means comprises an enlarged circumferential flow distributing passage communicating with said one end of said third and fourth flow passages, respectively, and inlet conduits coupled to said flow distributing passages, respectively.

14. Apparatus in accordance with claim 6, wherein said permeable wall is a thin membrane.

15. Apparatus for providing precisely controlled permeation of a first fluid into a second fluid, which comprises a housing having a wall therein permeable to said first fluid and having a core therein with a side wall of said housing spaced from a side wall of said core to provide a first flow passage therebetween and with an end wall of said core spaced from said permeable wall to provide a second flow passage coupled transversely to said first passage, means for admitting fluid to said first passage, and means for regulating the temperature of the fluid in said first passage, said temperature regulating means comprising heater means adjacent to a side wall of said first passage.

16. Apparatus in accordance with claim 15, wherein said core has an exhaust passage coupled to said second passage through said end wall.

17. Apparatus in accordance with claim 15, wherein said housing and said core are hollow cylinders.

18. Apparatus in accordance with claim 15, wherein said heater means is supported upon the side wall of said housing and said temperature regulating means includes means for insulating said housing from ambient conditions.

19. Apparatus in accordance with claim 18, wherein said heater means comprises an electric heater supported upon the exterior of said side wall of said housing.

20. Apparatus in accordance with claim 15, wherein said means for admitting fluid to said first passage comprises a flow distributing passage.

21. Apparatus in accordance with claim 15, wherein said permeable wall is a thin membrane.

22. Fluid mixing apparatus comprising a pair of longitudinally aligned cylindrical housing parts defining a housing, with a fluid permeable wall interposed transversely between adjacent ends of said housing parts to divide the interior of said housing, and a pair of cylindrical cores within said housing parts, respectively, with a side wall of said cores spaced from a side wall of the associated housing parts to define longitudinal fluid passages therebetween and with an end wall of said cores spaced from said permeable wall to define transverse fluid passages therebetween communicating with the associated longitudinal passages, means for admitting fluid to the end of each longitudinal passage remote from said permeable wall, and means for exhausting fluid from said transverse passages.

23. Apparatus in accordance with claim 22, the last-mentioned means comprising conduits extending through said end walls of said cores.

24. Apparatus in accordance with claim 22, wherein each of said admitting means comprises an enlarged circumferential flow distribution passage at said end of said longitudinal passages, respectively, and conduits coupled to said flow distributing passages.

25. Apparatus in accordance with claim 22, wherein said cores have exterior flanges at the open end thereof engaging an adjacent end of said housing parts, respectively, to limit the insertion of said cores into said housing parts, respectively.

26. Apparatus in accordance with claim 22, further comprising heater means supported upon the exterior of said side walls of said housing parts, and insulation means surrounding said housing parts.

27. Apparatus in accordance with claim 22, wherein said permeable wall is a thin membrane.

28. Apparatus in accordance with claim 27, wherein said membrane is supported upon an annular membrane holder at the periphery thereof.

29. Apparatus in accordance with claim 28 wherein said membrane is covered with a grid to support the same over its surface.

30. Apparatus in accordance with claim 28, said housing parts having means for detachably coupling the same together with said membrane holder interposed therebetween, said apparatus comprising an additional membrane holder adapted to be substituted for the first-mentioned membrane holder between said housing parts and providing a different exposed membrane area.

31. Apparatus in accordance with claim 22, wherein each of said cores is cup-shaped.

32. Apparatus in accordance with claim 22, wherein each of said longitudinal passages has a thickness cross-dimension perpendicular to the flow direction therein that is very small compared to the remaining cross-dimensions of the passage, so that fluid flows therethrough as a thin sheet.

33. Apparatus for providing precisely controlled permeation of a first fluid into a second fluid, which comprises a housing having a substantially planar wall therein permeable to said first fluid which separates first and second flow passages at opposite sides of said wall, means for supplying said first and second fluids to said first and second passages, respectively, means for exhausting fluid from said first and second passages, respectively, each of said first and second pasages being arranged with respect to the associated supplying and exhausting means so that fluid flow at each side of said permeable wall between the associated supplying means and exhausting means is between peripheral and central regions of said permeable wall, and means for controlling the temperature of said fluids and said permeable wall.

34. Apparatus in accordance with claim 33, wherein each of said supplying means provides fluid from the entire periphery of the permeable wall to a central region of the permeable wall.

35. Apparatus in accordance with claim 33, wherein said permeable wall is circular.

36. Apparatus in accordance with claim 33, wherein said means for supplying said first and second fluids to said first and second passages comprises third and fourth passages connected to said first and second passages, respectively, and wherein said temperature controlling means comprises heater means adjacent to said third and fourth passages and temperature sensor means adjacent to said permable wall.

37. Apparatus in accordance with claim 36, wherein each of said third and fourth passages is dimensioned such that fluid flows therethrough as a sheet of large surface cross-dimensions relative to the thickness of the sheet.

38. Apparatus in accordance with claim 33, wherein said means for controlling the temperature of said fluids comprises a heater means supported upon said housing and temperature sensor means adjacent to said permeable wall.

39. Apparatus in accordance with claim 33, wherein said permeable wall is a thin membrane.

40. Apparatus for providing precisely controlled permeation of a first fluid into a second fluid, which comprises a housing having a wall therein permeable to said first fluid separating first and second fluid flow passages at opposite sides of said wall, means including third and fourth flow passages in said housing for supplying said first and second fluids to said first and second passages, respectively, means for exhausting fluid from said first and second passages, respectively, and means including a temperature sensor adjacent to said permeable wall and heaters adjacent to said third and fourth passages for regulating the temperature of said fluids and said wall.

41. Apparatus in accordance with claim 40, wherein each of said third and fourth passages is dimensioned such that fluid flows therethrough as a sheet of large surface cross-dimensions relative to the thickness of the sheet.

42. Apparatus in accordance with claim 40, wherein said permeable wall is a thin membrane.

* * * * *